United States Patent
Czerner

(10) Patent No.: US 9,289,861 B2
(45) Date of Patent: *Mar. 22, 2016

(54) DEVICE FOR RECONTOURING A GAS TURBINE BLADE

(71) Applicant: LUFTHANSA TECHNIK AG, Hamburg (DE)

(72) Inventor: Stefan Czerner, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/368,276

(22) PCT Filed: Dec. 17, 2012

(86) PCT No.: PCT/EP2012/005196
§ 371 (c)(1),
(2) Date: Jun. 23, 2014

(87) PCT Pub. No.: WO2013/091812
PCT Pub. Date: Jun. 7, 2013

(65) Prior Publication Data
US 2015/0013126 A1    Jan. 15, 2015

(30) Foreign Application Priority Data
Dec. 22, 2011 (DE) .......................... 10 2011 089 701

(51) Int. Cl.
*B23P 6/00* (2006.01)
*B24B 19/14* (2006.01)
(Continued)

(52) U.S. Cl.
CPC . *B23P 6/002* (2013.01); *B23P 9/00* (2013.01);
(Continued)

(58) Field of Classification Search
CPC ........ B23P 6/002; B23P 9/00; B23P 2700/01; B23Q 9/0028; B24B 19/14; F01D 5/005; Y10T 29/49318; Y10T 29/37; Y10T 50/673
See application file for complete search history.

(56) References Cited

U.S. PATENT DOCUMENTS

| | | | |
|---|---|---|---|
| 4,001,978 | A | 1/1977 | Hales et al. |
| 5,197,191 | A | 3/1993 | Dunkman et al. |
| 6,106,204 | A | 8/2000 | Dansereau et al. |
| 6,302,625 | B1 | 10/2001 | Carey et al. |

(Continued)

FOREIGN PATENT DOCUMENTS

| | | |
|---|---|---|
| DE | 691 23 224 | 11/1992 |
| DE | 691 24 224 | 11/1992 |

(Continued)

OTHER PUBLICATIONS

Machine Translation of Peters, DE102011102543A1, Nov. 2012.*

*Primary Examiner* — Ryan J Walters
(74) *Attorney, Agent, or Firm* — Saliwanchik, Lloyd & Eisenschenk

(57) ABSTRACT

Device (1) for recontouring a gas turbine blade (2), comprising:
  at least one support (6a, 6b) configured to rest on an edge (3a) of the gas turbine blade (2) during the recontouring,
  at least one side bearing (5a, 5b) configured to rest on the suction- and/or pressure side (3b, 3c) of the gas turbine blade (2) in a lateral direction (7) during the recontouring,
  a machining unit (4) via which the gas turbine blade (2) is cutting machined in a machining direction (8) along the edge (3a),
wherein the machining unit (4) can be displaced perpendicularly to the machining direction (8).

18 Claims, 5 Drawing Sheets

(51) Int. Cl.
  *F01D 5/00* (2006.01)
  *B23Q 9/00* (2006.01)
  *B23P 9/00* (2006.01)

(52) U.S. Cl.
  CPC ............... *Y02T 50/673* (2013.01); *Y10T 29/37* (2015.01); *Y10T 29/49318* (2015.01) *B23Q 9/0028* (2013.01); *B24B 19/14* (2013.01); *F01D 5/005* (2013.01); *B23P 2700/01* (2013.01);

(56) References Cited

U.S. PATENT DOCUMENTS 9,040,870 B2 * 5/2015 Czerner ............... 219/121.65
2012/0047735 A1  3/2012 Czerner

FOREIGN PATENT DOCUMENTS

| DE | 10 2010 036 042 | 2/2012 |
| DE | 10 2011 102 543 | 11/2012 |
| EP | 0 514 604 | 11/1992 |

* cited by examiner

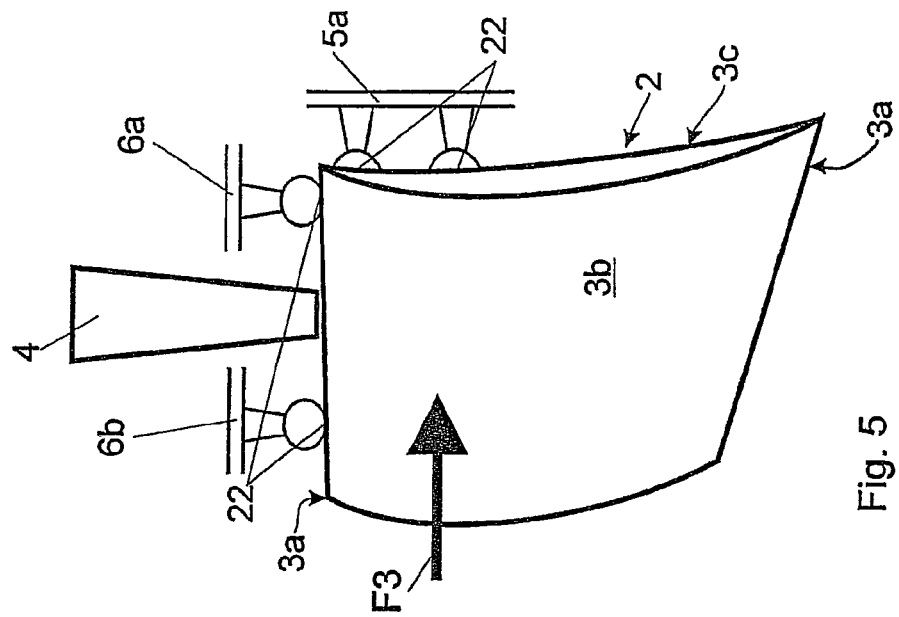
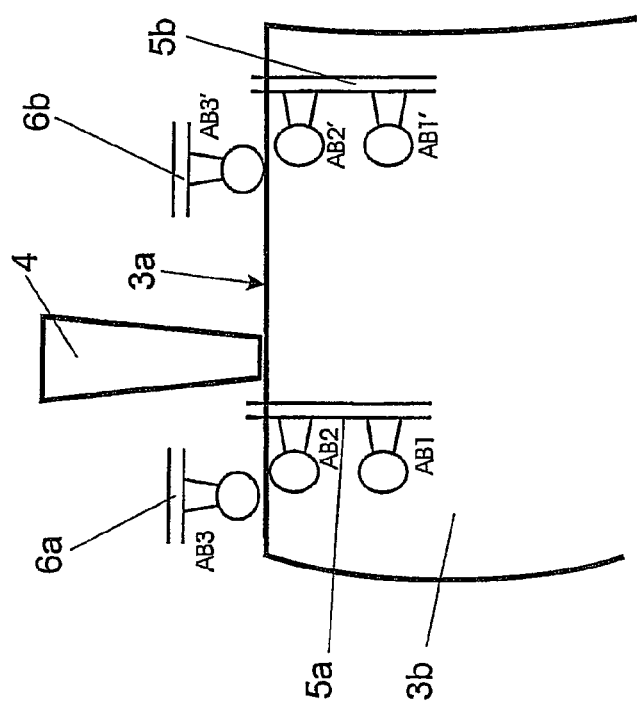
Fig. 5
Fig. 4

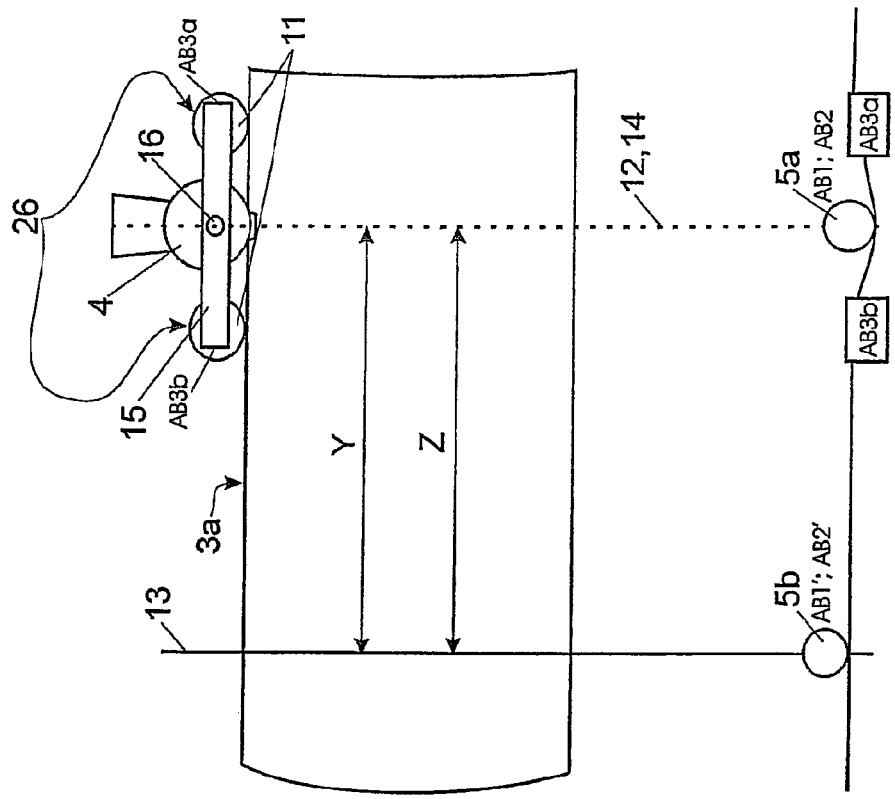
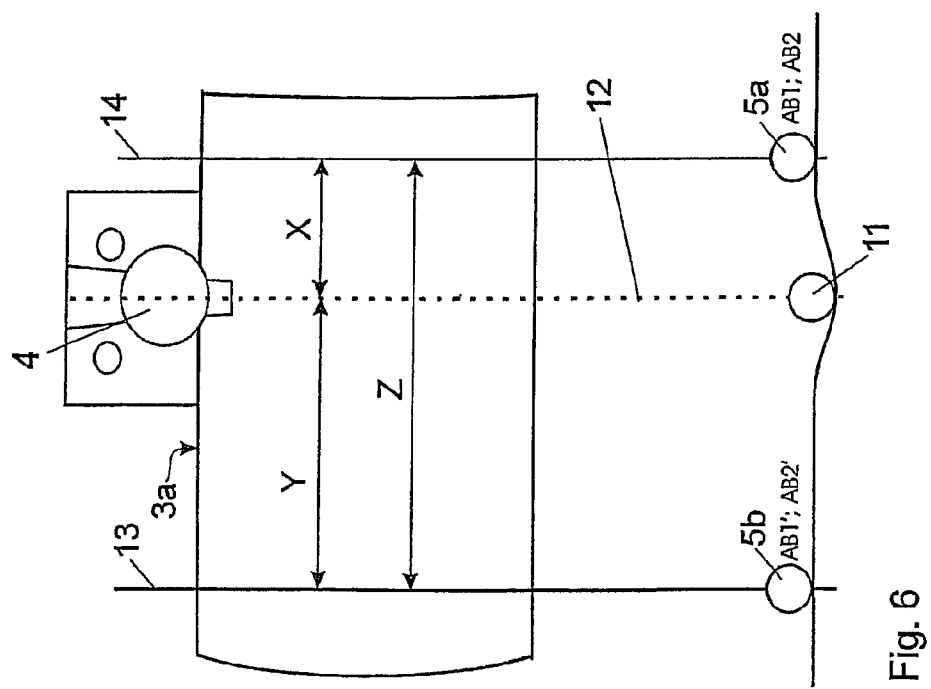
Fig. 7
Fig. 6

DEVICE FOR RECONTOURING A GAS TURBINE BLADE

CROSS-REFERENCE TO RELATED APPLICATIONS

The present application is the U.S. National Stage Application of International Patent Application No. PCT/EP2012/005196, filed on Dec. 17, 2012, which claims priority to German Patent Application No. 10 2011 089 701.1, filed on Dec. 22, 2011, both of which are hereby incorporated by reference herein in their entirety, including any figures, tables, or drawings.

The invention relates to a device for recontouring a gas turbine blade having the features of the preamble of claim 1.

In operation, the blades in gas turbines, more particularly in aircraft engines, are subject to wear caused by erosive particles, for example by sand or dust.

In the front part of the gas turbine, the compressor region, erosion generally brings about a flattening of the leading edges of the compressor blades. Here, the compressor blades of the first compressor stage, what are known as the fan blades, are many times larger than other blades of the engine. In the unworn state, the compressor blades have an aerodynamically optimised profile, which is disadvantageously altered due to the wear.

As a consequence of this type of deterioration of the aerodynamic profile, the gas turbine becomes less efficient, that is to say the gas turbine requires more fuel for the same performance.

From an economical point of view, therefore, counteracting the wear of compressor blades, more particularly a deterioration of aerodynamically optimised blade geometries, is worthwhile.

For this purpose, repair processes have been established which aim to provide damaged compressor blades with geometries that are as aerodynamically optimal as possible again.

A device is known from U.S. Pat. No. 6,302,625 B1 by means of which the blade edge can be recontoured. During the recontouring process, this device is guided towards the blade in a predetermined orientation by means of various positioners.

The positioners form a type of positive guidance towards the blade for the device, such that the device can be easily handled by coming into contact with the blade edge and moving along the blade edge.

The positioners are arranged in a lateral surface of a conically tapered slot, with which the device is placed onto one of the edges of the blade. When the device is placed on the blade edge, the positioners come into lateral contact with one of the blade surfaces. The placement depth of the device on the blade edge is limited by the conical form and the depth of the slot in the device. The actual portion of the device which changes the shape of the blade is arranged in the base of the slot.

Hence, the conical slot forms a guide for the device, the depth to which the device is placed on the blade being dependent on the individual handling of the device. Since in this device the recontouring of the blade takes place by means of machining the surface, it is also necessary to have a certain minimum clearance between the blade edge and the base of the slot in order to form a cavity in which excess material can be collected. Owing to this minimum clearance, the device cannot be guided with positional accuracy relative to the depth to which the blade edge projects into the slot.

Moreover, some gas turbine blades, for example new types of fan blades, are provided with geometrically complex edge geometries which complicate precise machining of the blade edges using known devices.

For example, for certain fan blades, the upper region of the blade operates in the supersonic range during operation and the lower region operates in the subsonic range. For this reason, the contour of the blade is changed, both in pitch angle and in cross section, and presents a complex edge geometry which can only be precisely machined with difficulty.

Furthermore, base material of the gas turbine blade is always worn away by the cutting machining that is routinely used and hence the chord length of the blade is shortened by the recontouring process.

The problem addressed by the present invention is therefore that of providing a device for recontouring a gas turbine blade, with which the above-mentioned problems can be reduced or avoided.

To solve this problem, a device for recontouring a gas turbine blade is proposed, comprising:
- at least one support configured to rest on an edge of the gas turbine blade during the recontouring;
- at least one side bearing configured to rest on the suction- and/or pressure side of the gas turbine blade in a lateral direction during the recontouring;
- a machining unit via which the gas turbine blade is machined in a machining direction along the edge, characterised in that the machining unit can be displaced perpendicularly to the machining direction.

The feature of being perpendicular to the machining direction includes all directions extending transversely to the machining direction. Here, two directions are preferred, on the one hand, the lateral direction in which the side bearings also rest on the gas turbine blade, and on the other hand the vertical direction, which is perpendicular both to the machining direction and to the lateral direction. Thus, the machining unit is preferably movable in the lateral direction and/or in the vertical direction.

The machining direction is to be understood as the direction in which the device is moved. Here, the direction can be defined for example by two points (start and end point of the machining), which are connected by an imaginary line (the machining direction). This imaginary line, particularly for complex blade geometries, is not identical to the outline of the edge, which has curves or rounded areas, for example. The device adjusts to these deviations due to the displacement ability of the machining unit, such that the quality of the recontouring is improved.

The ability to be displaced perpendicular to the machining direction enables the machining unit to follow the course of the edge particularly well, that is to say both lateral irregularities and deviations in the vertical direction. These may be, for example, dents or rounded areas already carried out. Such irregularities, as described in detail at a later point, can have an adverse effect on the quality of a recontouring.

The advantage of the solution according to the invention is considered that the device can be adapted to possible variations in construction of the gas turbine blade owing to the improved guidance, and the recontouring process can be carried out without a change in position and without vibrations.

The particular advantage of the proposed guidance can also be seen in that the improved guidance takes place by guidance along the edge to be machined, such that the machining unit provided on the device is guided with a constant machining clearance from the edge or with a constant orientation relative to the edge. Hence, the device is able to follow the course of the edge. This is particularly advantageous since the clearance and the orientation of the machining unit relative to the edge are particularly important for the quality of the recontouring, as is the case for example when fusing the edge, as described below, or when cutting machining the edge.

Moreover, the device can also be used on geometrically very complex blade edge geometries, in particular also on various different types of gas turbine blades.

Cutting machining can be carried out alternatively or in addition to the non-cutting machining described below. The machining unit can also for example be exchangeable and the device can be used for cutting or non-cutting recontouring by selecting the machining unit.

Similarly to the non-cutting machining, the component can be improved in terms of its aerodynamic characteristics by a cutting device or machining unit. The cut contour produced in this process is aerodynamically more advantageous than the erosion contour produced by the wear.

The guidance of the device can be improved by a range of additional features.

Preferably, the device comprises, for example, at least two supports and at least two side bearings. Hence, the stability and secure guidance of the device can be increased.

Preferably, the machining unit is arranged between the supports. Arrangement between the supports has an advantageous effect on the machining precision since the device is thus better protected from tilting in the machining direction.

Preferably, the side bearings each feature at least two contact points and/or contact faces. Depending on whether the side bearing, for example, comprises rotary elements, the side bearings may be in contact with the blade via surfaces or points. The side bearings guide the device, such that the machining element can always be applied precisely.

Preferably, this guidance can be improved by the contact points and/or contact faces of at least one side bearing being in a contact plane with the support point or the support face of a support. This contact plane preferably extends perpendicular to the machining direction, as is described in detail at a later point with reference to FIGS. 2 to 5. The advantage of this type of arrangement can be seen in that it enables more precise device guidance in comparison with known devices.

The secure guidance can be further improved if another, second contact plane is provided in which the contact points of the side bearings and supports are also in a plane which, in turn, preferably extends perpendicular to the machining direction. Hence, it is preferred for the contact points and/or contact faces of at least one further side bearing to be in a contact plane together with the support point or the support face of a further support.

In order to avoid grinding marks and/or scratches on the gas turbine blade, preferably one or more of the supports and/or side bearings is formed by rotatably mounted rollers.

To improve the positioning of the device on the gas turbine blade, preferably one or more pressing devices are provided on the suction- and/or pressure side of the gas turbine blade which faces the side bearings. Preferably, at least one pressing device is provided. The force is preferably applied by movable rollers or belts, which generate the pressure forces, independently of the thickness of the gas turbine blade, via pneumatic pressure plates and/or spring elements. Consequently, the at least one pressing device preferably comprises pneumatic elements, hydraulic elements and/or spring elements.

Owing to the pressing device, the device can effectively fix itself on the blade, exerting a clamping force, such that the device, even under the restoring forces acting via the machining unit during the machining process, will not detach from the blade or move unintentionally relative to the blade.

Preferably, the pressing device comprises rotatably mounted rollers. Overall, an essentially more steady movement can be produced by the use of rollers, whereby, particularly for a continuous recontouring of the edge, very low and steady feed rates are made possible.

In this case, it is advantageous if at least one roller can be driven by a drive device. The device can be moved in a controlled manner along the edge of the blade by the drive device, the control particularly making possible very steady and small feed movements.

In addition, it is proposed that the drive device and the machining unit be controlled in a coupled manner. If the machining unit recontours the edge for example by fusion, build-up mwelding or even cutting machining, the feed rate of the device has at least an indirect influence on the contouring accuracy of the recontoured edge, such that this correlation can be taken into account by coupled control of the drive device and the machining unit. Thus, for example the machining unit can be automatically deactivated upon reaching an end position of the device or when the device comes to a standstill, or the intensity of the machining can be increased in the case of rapid guidance. Accordingly, for slower guidance, the intensity can be reduced.

In addition, it is proposed that the rollers are coated with an elastomer. Due to the proposed coating of the rollers, these are at least slightly resilient on the surface, such that slight unevenness on the surface of the blade can be compensated and, moreover, resilient clamping forces can be more easily exerted on the blade, without the device per se having to be particularly resilient in design.

In a further preferred embodiment, at least one of the supports comprises two rollers, which are interconnected via a rotatably mounted shaft, and the machining being carried out between the two rollers. In this way, it is made possible for the machining plane to coincide with a contact plane. This advantageous configuration will be explained at a later point with reference to FIG. 5.

The quality of the recontouring is preferably improved by the machining unit being configured to fuse at least a partial region of the edge in a targeted manner using a beam of energy in such a way that the material solidifies into a new contour substantially without the addition of supplementary material. Here, the beam of energy is preferably configured as a laser beam.

A device, which is configured for this type of machining of the blade edge using a beam of energy substantially without the addition of supplementary material, is markedly different from the known devices. One particular advantage of the device is that there is no material loss in the recontouring due to the machining process (for example grinding processes). Accordingly, there is also no change (or an extremely minimal change) in the moment weight due to the recontouring and, accordingly, no measurable change (or an extremely slight change) in the run-out due to the inertia of the gas turbine blades when installed.

Moreover, this type of device has the advantage that the chord length of the gas turbine blades is not shortened further due to the machining, but instead, as described below, can even be partly reconstructed. As a result, the gas turbine blade can be used for considerably longer, which reduces maintenance costs for the engine significantly.

Preferably, due to machining using the device, the material solidifies into a given contour substantially without the addition of supplementary material. Here, given means that the fusing of the material and the following change in the geometry are not random, but that the device allows a particular shape or geometry to be produced which is similar to the original contour of the part when new, which is advantageous, for example, in terms of its aerodynamic properties.

Thus, a "new contour" describes a profile that is largely oriented towards the state of the part when new, upon delivery.

In addition to recontouring substantially without the addition of supplementary material, the device preferably is also configured to recontour the blade edge using a build-up welding process with the addition of supplementary material.

Preferably, very small amounts of supplementary material can be introduced into the region fused by the beam of energy. The machining is indeed characterised in that the addition of supplementary material can be substantially dispensed with; however, very small amounts (less than 50% of the fused volume) of supplementary material can be introduced into the fusing zone, for example in order to produce a particularly hard, erosion-resistant or otherwise advantageous leading edge. Unlike the known methods, these additives serve less to restore the eroded volume of the leading edge (as is the case, for example, with build-up welding) than to advantageously modify the material properties of the leading edge.

In this context, the ability of the machining unit to be displaced laterally is also to be understood to be a focussing of the beam of energy, more particularly a laser beam, in a lateral direction. The machining unit then comprises elements, for example mirrors, by means of which the laser beam can be moved back and forth in a lateral direction, in order always to keep the laser beam directed towards the edge.

The device preferably comprises a laser unit for generating the laser beam, the laser beam preferably being guided from a generator to the machining unit via optical waveguides. It leaves the optical waveguide on the machining unit and impinges on the edge. Thus, the optical waveguide is preferably directed towards the edge. In this process, the impinging on the edge is also referred to as "coupling in". By coupling in the laser, energy is introduced into the edge, which is used to remelt or recontour the edge.

Preferably, in this case the entire device is portable. The device preferably comprises a convenient attachment in which the machining unit is arranged and which is guided along the edge by the supports and side bearings, and comprises a laser unit connected to the convenient attachment, in which a laser is generated and then passed to the machining unit. Overall, the device is preferably dimensioned such that it is suitable for mobile use at different sites.

Hence, a plurality of blades can be recontoured "on wing", whereby the maintenance time for which the gas turbine is not operational can be considerably reduced. For on wing machining, the blades are recontoured while they are installed in an engine suspended from the wing of an aircraft. Since the device is portable, it can be easily transported from operating site to operating site in order to enable on wing recontouring of the blades onsite.

The invention is described in the following on the basis of preferred embodiments with reference to the accompanying drawings, in which:

FIG. 4 shows the preferred double three-point support of the device;

FIG. 5 shows forces acting on the blade;

FIG. 6 is a composite side- and plan view of the device positioned on a blade edge;

FIG. 7 is a composite side- and plan view of a further embodiment of the device;

Figure 1:
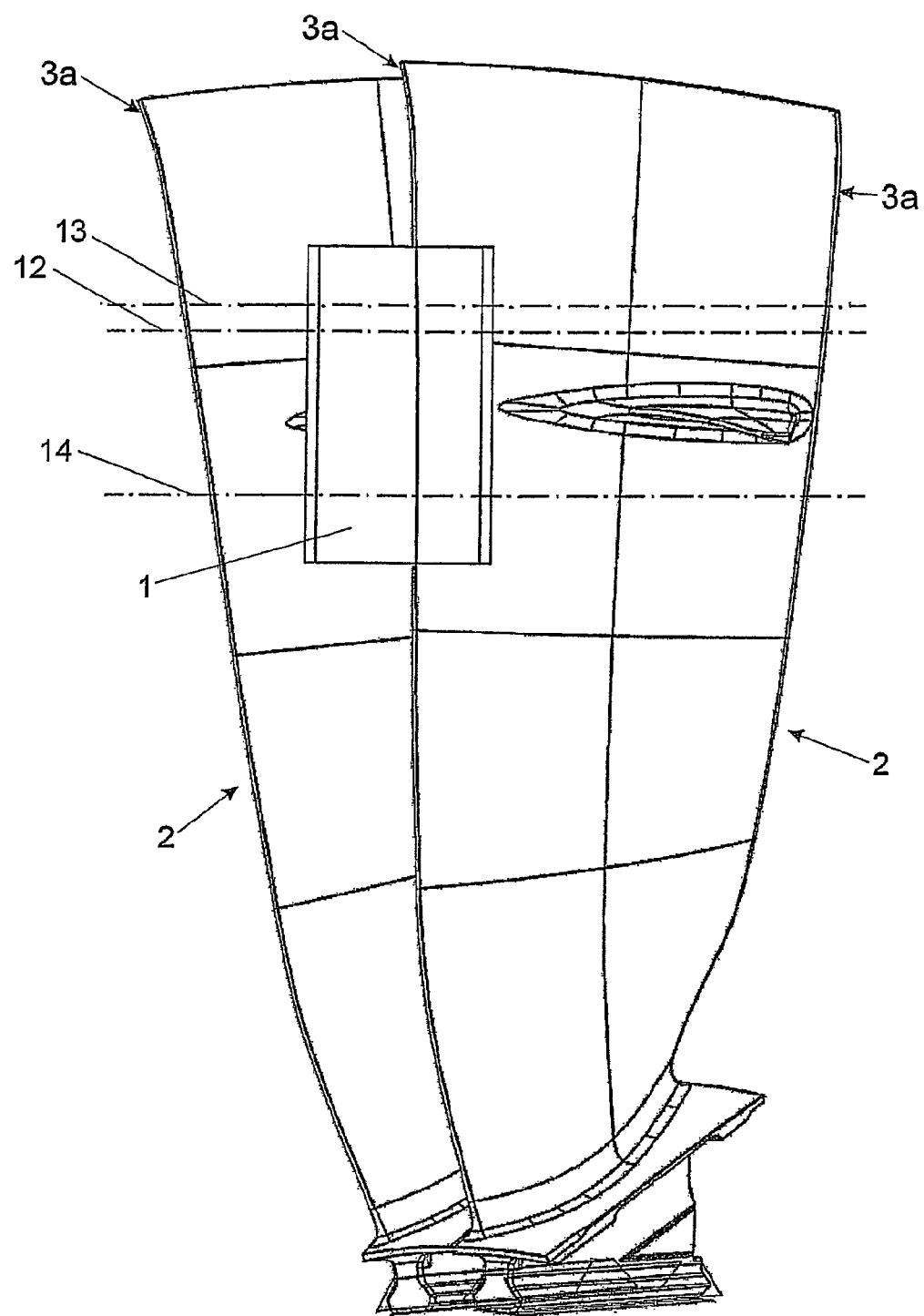
FIG. 1 shows a device for recontouring an edge of a blade.

FIG. 1 shows a device 1 according to the invention on a blade 2, which is part of a blade ring of a compressor stage or of a guide vane ring of a gas turbine, more particularly of an aircraft engine. The outer dimensions of the device 1 are such that it can be guided in a flow channel to an adjacent blade 2, without having to dismantle blades 2 for this purpose. Hence, the blade 2 can be recontoured "on wing", whereby the maintenance time for which the gas turbine is not operational can be considerably reduced. For on wing machining, the blade 2 is recontoured while it is installed in an engine suspended from the wing of an aircraft. Thus, the blade 2 does not have to be removed from the engine for machining.

The blades 2 each have two edges 3a, a flow leading edge and a flow trailing edge. Using the device 1, both the flow leading edge and the flow trailing edge can be machined and recontoured.

In FIG. 1, the machining plane 12 and the two guidance- or contact planes 13 and 14, described in detail at a later point, are also illustrated.

Figure 2:
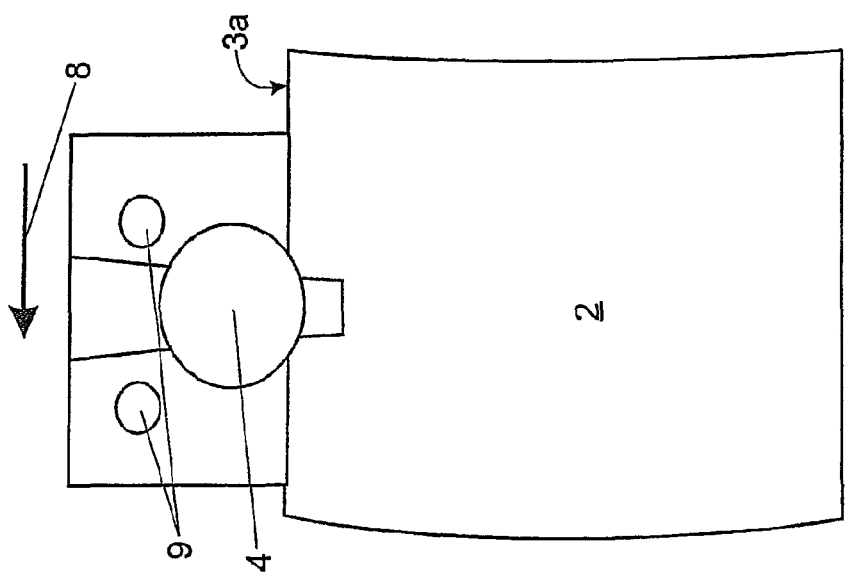
FIG. 2 is a side view of the machining unit positioned on a blade edge.

FIG. 2 is a side view of the machining unit 4, which is part of the device 1 and is positioned on a blade edge 3a. The machining unit 4, together with the device 1, is guided in a machining direction 8, along the edge 3a. In this view, the housing of the device 1 and other parts of the device have been omitted for the sake of clarity.

During the machining movement, the edge 3a is recontoured by the machining unit 4, and this embodiment relates to the flow leading edge of the blade 2.

The machining unit 4 can be moved in the direction of the image plane via displacement shafts 9. This displacement mechanism is shown again in FIG. 2.

Figure 3:
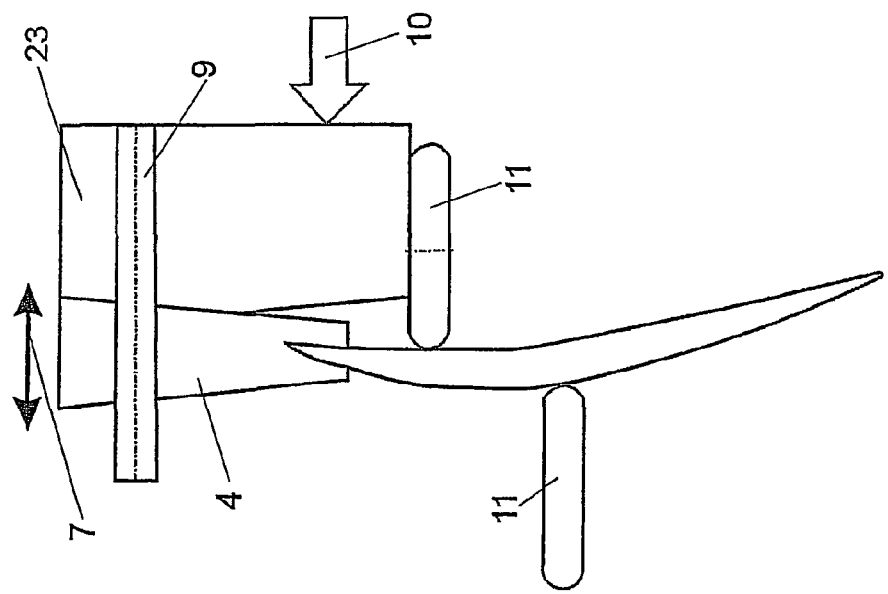
FIG. 3 is a sectional view of the machining unit positioned on a gas turbine blade and comprising a roller to compensate dents in the gas turbine blade.

FIG. 3 is a sectional view through the machining unit 4, which is shown positioned on a blade 2, also shown in section. The blade 2 naturally has a convex suction side 3b and a concave pressure side 3c.

In this embodiment, the device 1 comprises an axial adjusting unit 23, which is connected to the machining unit 4 by means of displacement shafts 9, whereby the lateral displacement of the machining unit 4 is made possible. The lateral displacement on the displacement shaft 9 can be realized, for example, by linear units.

In addition, the adjusting unit 23 in this embodiment comprises a roller 11 which is coated with an elastomer and is arranged on the lateral surface of the blade, in this case the pressure side 3c, and which serves to guide the adjusting unit 23 or the machining unit 4 which is connected to the adjusting unit 23.

The machining unit 4 can be displaced in a lateral direction 7. This lateral direction 7 extends transversely to the machining direction 8. In this embodiment, it also extends at a tangent to the edge 3a. The unidirectional adjusting force 10 can be provided, for example, by a spring or a pneumatic system.

FIGS. 4 and 5 show the preferred double three-point support of the device 1. Three-point support always comprises a side bearing 5a or 5b, each of which is in contact with a lateral surface of the blade 2 via two contact points 22, and a support 6a or 6b, which rests via a contact point 22 on the edge 3a of the blade. In an alternative embodiment, further supports can also be provided.

In this embodiment, a three-point support is formed by the support 6a and the side bearing 5a, the support 6a comprising the guide point AB3 and the side bearing 5a comprising the guide points AB1 and AB2.

The second three-point support is formed by the support 6b and the side bearing 5b, the support 6b comprising the guide point AB3' and the side bearing 5b comprising the guide points AB1' and AB2'.

The machining unit 4 is arranged between the three-point supports.

The compression force F3 supports the pressure forces and the forces resulting from the movement of the device, which compression force F3 is preferably exerted on the opposite side of the blade 2. Said force is preferably exerted in a region located centrally between the three-point supports. Alternatively, a plurality of pressure forces, whose resulting compression force approximately corresponds to the compression force F3, can also be used in operation.

Preferably, the pressure forces are used to produce a feed movement on the blade 2 via driven rollers 11 or belts. Thus, a motorised feed movement is preferred; however, in another embodiment, feed movements that are brought about manually may also be preferred. In FIG. 3, the left-hand roller 11 (on the suction side 3b of the blade 2) is designed as a pressure roller; the right-hand roller 11 (on the pressure side 3c of the blade 2) is produced as a guide roller. The guide roller serves to move the machining process, when, for example, there is a dent in the blade 2 between the two supports 6a and 6b. It follows the deviation in the blade 2 and repositions the machining process. The pressure roller, which produces the feed movement, uses the compression force F3, at least partially, as a friction connection.

The force F3 is preferably provided via a pressing device (not shown) which is preferably designed so as to be pneumatic. Alternatively, toggle clamps, hydraulics, spindles or linear motors are preferred.

For inserting or removing the device 1, the pressing device or the force F3 is reversed. In operation, the same is adjusted, preferably in a force-controlled manner, to the varying thicknesses of the components.

If necessary, the adjusting unit 23 of the machining unit 4 is preferably capable of compensating minor deviations and slight damage at the level of the machining.

FIGS. 6 and 7 clearly show the geometric conditions at the margin. The upper part of each of the figures is a side view and the lower part is a plan view. The device 1 is guided along the blade 2 via two three-point supports, each of which is located in a contact plane 13, 14.

The overall clearance Z between the contact planes 13, 14 is X+Y. If, for example, a dent within the blade edge should cause a deviation, then this impinges on the machining plane 12 with the clearance X. This dimensional deviation is therefore not present if X=0. Very small deviations are obtained if X is minimal and Y is maximal.

In the embodiment in FIG. 6, a roller 11 allows the machining unit 4 to be guided precisely along the edge 3a, since the machining unit 4 can optionally be adapted to deviations in the course of the edge by this repositioning roller, and more particularly can be shifted laterally.

A further embodiment is shown in FIG. 7. Here, the X value has been reduced to zero. In this way, too, maximum axial adaptation accuracy is achieved by the device 1.

By reducing the X value to zero, the technical advantage of the tangential adaptation to the flow surface being maximized is also achieved. Here, the two guide points AB1 and AB2, designed as guide rollers, ensure the tangential adaptation.

The problem arising in this process under certain circumstances of the positioning location and the machining function being in the same position can be solved by replacing the support 6a or the guide point AB3 with a pair of rollers 26. The pair of rollers 26 (AB3b and AB3a) comprises two rollers 11, which are connected by a shaft 15 and are arranged on the machining unit 4 at a pivot point 16.

Owing to the rotatably mounted shaft, dimensional inaccuracies, roughened regions and variations in height before and after the machining can be evened out. An additional roller 11 for repositioning (as, for example, in FIG. 6) can thus be omitted.

The machining unit 4 can comprise cutting or grinding machining of the edge 3a. Alternatively, material application using build-up welding or reshaping of the edge 3a by means of fusion of the edge 3a is also conceivable, for example as is disclosed in the application DE 10 2010 036 042.2 which was filed by the applicant but has not yet been published. With respect to the fusion technique, the application DE 10 2010 036 042.2 is intended to be added to the disclosure of this application in its entirety.

By way of example, the preferred fusing of the edge 3a is intended to be explained with reference to FIG. 8.

Figure 8:
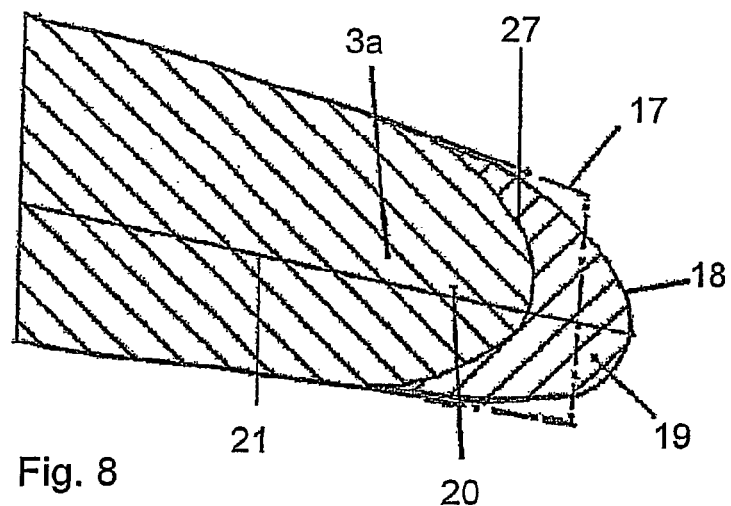
FIG. 8 is a sectional view through a leading edge of a gas turbine blade before and after recontouring.

In FIG. 8, the edge 3a is shown in an enlarged form. Here, the condition before repair using the device 1 is identified as an erosion contour 17. The erosion contour 17 is generally approximately planar and has an end face. The condition of the edge 3a after the repair is shown as a new contour 18 or a cut contour 27. Using the device, which preferably comprises a laser unit to generate a laser beam, a certain volume of the eroded edge 3a is fused in a targeted manner and solidifies into a shape which is aerodynamically more advantageous. This transition from the erosion contour 17 to the new contour 18 is achieved here by a redistribution of the available material. Material is neither removed nor added. The re-solidified material 19 is the front region of the edge 3a, which has come from a molten mass, and behind which the region having the unmelted base material 20 is to be found.

By using an appropriately configured device 1, which comprises a laser unit for machining, the chord length of the blade 2 can thus partially be reconstructed. In FIG. 8, a chord length portion 21 is shown.

Owing to the improved guidance of the device 1, the machining unit 4 can preferably be moved to the edge 3a without contact, which was not possible according to the solution known from the prior art. The clearance of the machining unit 4 is important since the recontouring of the edge 3a for example by fusion may also involve a change in the shape of the edge 3a in the direction of the machining unit 4, which should not be impeded by the placement of the machining unit 4.

Where the machining unit 4 recontours the edge 3a by fusion or build-up welding, one of the two supports 6a or 6b is positioned on the edge 3a which has not yet been machined, i.e. the edge which is still cold, while the respective second support 6a or 6b is positioned on an already recontoured portion of the edge 3a. Here, the clearance of the supports 6a and 6b from the machining unit 4 is selected such that the supports 6a and 6b are not damaged by the heated edge 3a in the contact region and their guidance function is not affected. Likewise, the recontoured edge 3a is not damaged by the supports 6a, 6b.

Where a cutting technique such as grinding, milling or shaving is used in the machining unit 4 to round off the edge 3a, the original erosion contour 17 can be formed into an aerodynamically beneficial cut contour 27 while reducing the chord length 21. Here, the cut contour 27 that is produced is better than the erosion contour 17 in terms of its aerodynamic properties.

The machining unit 4 can also incorporate a combination of the other machining techniques mentioned above, which are consecutively arranged in the longitudinal direction of the edge 3a, such that the edge 3a for example is consecutively machined using various machining techniques. So it is conceivable, for example, to thicken the edge 3a by means of build-up welding first using additional material, and then to produce the target shape of the edge 3a by grinding or using a cutting machining process. During this movement, the edge 3a, of which the shape has been changed due to erosion and other wear, is recontoured by the device 1 to an aerodynamically more advantageous shape and, in particular, is rounded off.

A preferred guidance for the device 1 can be achieved by the supports 6a and 6b and the side bearings 5a and 5b coming into contact with the blade in directions which are at an angle of 90 degrees to one another. The supports 6a and 6b are supported perpendicularly on the edge 3a, and the side bearings are at an angle of 90 degrees to said edge in a lateral direction 7.

Figure 9:
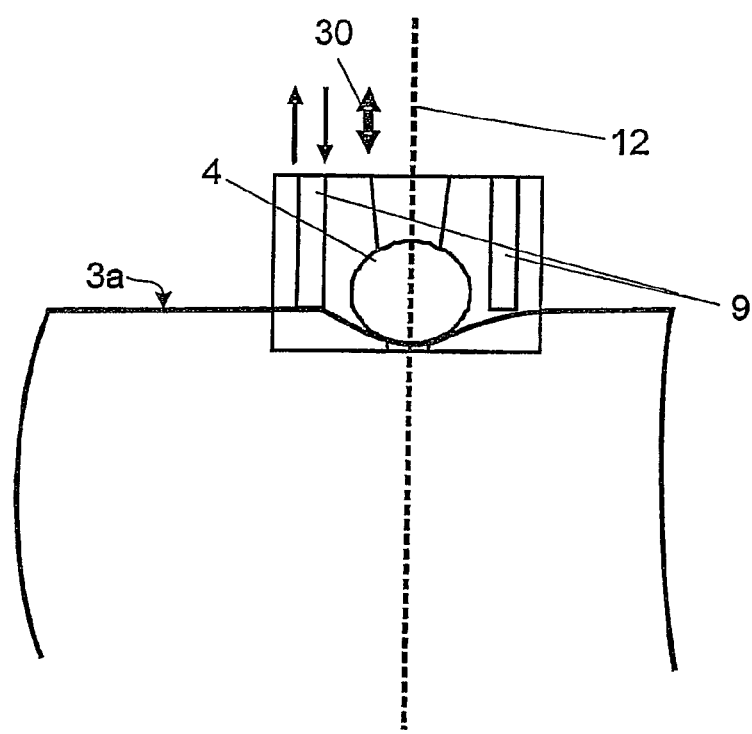
FIG. 9 shows the pressure-controlled readjustment of the height positioning.

FIG. 9 shows a further improvement. Underlying this is a problem occurring in known cutting recontouring techniques. For example, with the device described in U.S. Pat. No. 6,302,625 B1, for indentations in blade edges, the result may be that the machining unit used there may not be able to follow an additional indentation.

According to certain specifications, these indentations occur when, for example, a notch in the edge of the blade has been caused by a stone or similar. Rounding off uses defined radii for the overall rounding off and may only be carried out over a certain region of the leading edge. If the machining tool or the machining unit does not follow the contour exactly, but has a delayed reaction to the indentation, for example due to the clearance of the supports installed, then, when the first support dips into or is lowered into the indentation, the original region of the rounding-off (blending) is further extended, whereby this may result in the permissible breach range being exceeded.

In addition to the unnecessary removal of material when the first support enters, dips or is lowered into the indentation, there is a reduced removal at the deepest point of the indentation due to the supports providing a linear course for the leading edge or the trailing edge. Further material is unnecessarily removed upon moving out of the indentation since the support following the cutting process is still in the indentation, while the cutter is already passing the trailing edge of the indentation and hence is processing with an undefined and, if in doubt, an unnecessarily large amount of material removal.

A pressure-controlled infeed of the machining unit to the machining edge, as shown in FIG. 9, provides a remedy here.

This pressure control defines the pressure force of the machining unit 4. Hence, the machining unit 4 follows the edge 3a in a force-controlled manner. Alternatively, the sensors can be used in order to produce a path control with the same pattern of movement. Preferably, this operates in a force-controlled manner with a pneumatic unit. This is, moreover, also used to withdraw the machining unit 4 from the workpiece at the end of the machining, such that, for example, excessive material removal at the end of the machining, that is when the device is stationary, is prevented. Damaging friction is also prevented from causing the (titanium) base material to overheat when the device is stationary.

Here, the machining unit 4 is preferably adjusted using linear units. The displacement shaft 9 made possible as a result is adjusted towards the edge 3a in the vertical direction 30. Here, the linear units are preferably produced as dovetail guides or pillar guides.

LIST OF REFERENCE NUMERALS

1 Device
2 Blade
3a Edge
3b Suction side
3c Pressure side
4 Machining unit
5a Side bearing
5b Side bearing
6a Support
6b Support
7 Lateral direction
8 Machining direction
9 Displacement shaft
10 Adjusting force
11 Roller
12 Machining plane
13 Contact plane
14 Contact plane
15 Shaft
16 Pivot point
17 Erosion contour
18 New contour
19 Re-solidified material
20 Base material
21 Chord length portion
22 Contact points
23 Adjusting unit
24 Pressure- and/or drive roller
26 Pair of rollers
27 Cut contour
30 Vertical direction

The invention claimed is:

1. A device for recontouring a gas turbine blade, comprising:
   at least one support configured to contact an edge of a gas turbine blade during recontouring of the gas turbine blade;
   at least one side bearing configured to contact a suction side, or a pressure side, of the gas turbine blade during the recontouring;
   a machining unit,
   wherein the machining unit machines the edge as the machining unit travels in a machining direction along the edge of the gas turbine blade, and
   wherein the device is configured such that the machining unit can be moved in at least one direction perpendicular to the machining direction; and
   at least one pressing device,
   wherein the at least one pressing device applies a force that presses one or more side bearings of the at least one side bearing to the suction side, or to the pressure side, of the gas turbine blade that faces the one or more side bearings of the at least one side bearing, and
   wherein the at least one pressing device comprises one or more elements from the group consisting of: a pneumatic element, a hydraulic element, and a spring element.

2. The device according to claim 1,
wherein the device is configured such that the machining unit can be moved in a lateral direction that is perpendicular to the machining direction, and
wherein moving the machining unit in the lateral direction tends to separate the at least one side bearing from the suction side, or the pressure side, or push the at least one side bearing into the suction side, or the pressure side.

3. The device according to claim 2,
wherein the device is configured such that the machining unit can be moved in a vertical direction, and
wherein moving the machining unit in the vertical direction tends to separate the machining unit from the edge or push the machining unit toward the edge.

4. The device according to claim 1,
wherein the device is configured such that the machining unit can be moved in a vertical direction, and
wherein moving the machining unit in the vertical direction tends to separate the machining unit from the edge or push the machining unit toward the edge.

5. The device according to claim 1,
wherein the at least one support comprises at least two supports and the at least one side bearing comprises at least two side bearings.

6. The device according to claim 5,
wherein the machining unit is arranged between two supports of the at least two supports.

7. The device according to claim 1,
wherein each side bearing of the at least one side bearing comprises at least two contact points or at least two contact faces.

8. The device according to claim 7,
wherein each support of the at least one support comprises a support point or a support face, and
wherein a first at least two contact points, or a first at least two contact faces, of a first side bearing of the at least one side bearing are in a first contact plane together with a first support point, or a first support face, of a first support of the at least one support.

9. The device according to claim 8,
wherein a second at least two contact points, or a second at least two contact faces, of a second side bearing of the at least one side bearing are in a second contact plane together with a second support point, or a second support face, of a second support of the at least one support.

10. The device according to claim 1,
wherein a first support of the at least one support comprises a rotatably mounted roller.

11. The device according to claim 1,
wherein a first side bearing of the at least one side bearing comprises a rotatably mounted roller.

12. The device according to claim 11,
wherein the rotatably mounted roller is driven by a drive device.

13. The device according to claim 12,
wherein the drive device and the machining unit are controlled in a coupled manner.

14. The device according to claim 1,
wherein a first pressing device of the at least one pressing device comprises one or more rotatably mounted rollers.

15. The device according to claim 14,
wherein a first rotatably mounted roller of the one or more rotatably mounted rollers is driven by a drive device.

16. The device according to claim 15,
wherein the drive device and the machining unit are controlled in a coupled manner.

17. A device for recontouring a gas turbine blade, comprising:
at least one support configured to contact an edge of a gas turbine blade during recontouring of the gas turbine blade;
at least one side bearing configured to contact a suction side or a pressure side of the gas turbine blade during the recontouring; and
a machining unit,
wherein the machining unit machines the edge as the machining unit travels in a machining direction along the edge of the gas turbine blade,
wherein the device is configured such that the machining unit can be moved in at least one direction perpendicular to the machining direction,
wherein a first support of the at least one support comprises two rollers,
wherein the two rollers are interconnected by a rotatably mounted shaft, and
wherein the machining unit machines the edge between the two rollers.

18. A method for recontouring a gas turbine blade, comprising:
providing a device for recontouring a gas turbine blade,
wherein the device for recontouring a gas turbine blade comprises:
at least one support configured to contact an edge of a gas turbine blade during recontouring of the gas turbine blade;
at least one side bearing configured to contact a suction side, or a pressure side, of the gas turbine blade during the recontouring;
a machining unit,
wherein the machining unit machines the edge as the machining unit travels in a machining direction along the edge of the gas turbine blade,
wherein the device is configured such that the machining unit can be moved in at least one direction perpendicular to the machining direction; and
at least one pressing device,
wherein the at least one pressing device applies a force that presses one or more side bearings of the at least one side bearing to the suction side, or to the pressure side, of the gas turbine blade that faces the one or more side bearings of the at least one side bearing, and
wherein the at least one pressing device comprises one or more elements from the group consisting of: a pneumatic element, a hydraulic element, and a spring element; and moving the machining unit in the machining direction while machining the edge of the gas turbine blade.

* * * * *